(12) United States Patent
Jork et al.

(10) Patent No.: US 8,069,687 B2
(45) Date of Patent: Dec. 6, 2011

(54) WORKING MEDIA FOR REFRIGERATION PROCESSES

(75) Inventors: Carsten Jork, Frankfurt am Main (DE); Matthias Seiler, Griesheim (DE); Bernd Weyershausen, Essen (DE)

(73) Assignee: Evonik Degussa GmbH, Essen (DE)

( * ) Notice: Subject to any disclaimer, the term of this patent is extended or adjusted under 35 U.S.C. 154(b) by 1008 days.

(21) Appl. No.: 11/922,241

(22) PCT Filed: May 24, 2006

(86) PCT No.: PCT/EP2006/062567
§ 371 (c)(1),
(2), (4) Date: Dec. 31, 2007

(87) PCT Pub. No.: WO2006/134015
PCT Pub. Date: Dec. 21, 2006

(65) Prior Publication Data
US 2010/0095703 A1    Apr. 22, 2010

(30) Foreign Application Priority Data
Jun. 17, 2005    (DE) .......................... 10 2005 028 451

(51) Int. Cl.
F25B 15/00    (2006.01)
(52) U.S. Cl. ....................................................... 62/476
(58) Field of Classification Search .................... 62/101, 62/271, 476; 252/67
See application file for complete search history.

(56) References Cited

U.S. PATENT DOCUMENTS

| | | | |
|---|---|---|---|
| 1,882,258 A | 10/1932 | Randel | |
| 2,802,344 A | 8/1957 | Witherell | |
| 4,152,900 A | 5/1979 | Chopra et al. | |
| 4,152,901 A | 5/1979 | Munters | |
| 5,873,260 A | 2/1999 | Linhardt et al. | |
| 7,435,318 B2 | 10/2008 | Arlt et al. | |
| 2004/0133058 A1 | 7/2004 | Arlt et al. | |
| 2005/0070717 A1 | 3/2005 | Wasserscheid et al. | |
| 2006/0150665 A1 | 7/2006 | Weimer et al. | |
| 2006/0251961 A1 | 11/2006 | Olbert et al. | |
| 2008/0028777 A1 | 2/2008 | Boesmann et al. | |
| 2008/0283383 A1 | 11/2008 | Ruffert et al. | |
| 2010/0326126 A1 | 12/2010 | Seiler et al. | |
| 2011/0000236 A1 | 1/2011 | Seiler et al. | |

FOREIGN PATENT DOCUMENTS

| | | |
|---|---|---|
| DE | 400 488 | 8/1924 |
| DE | 633 146 | 7/1936 |
| DE | 36 23 680 A1 | 1/1988 |
| DE | 195 11 709 | 10/1996 |

(Continued)

OTHER PUBLICATIONS

English language translation of the International Preliminary Report on Patentability for PCT/EP2006/062567 filed May 24, 2006.

(Continued)

*Primary Examiner* — Melvin Jones
(74) *Attorney, Agent, or Firm* — Law Office of: Michael A. Sanzo, LLC

(57) ABSTRACT

A working medium for refrigeration processes comprising at least one sorbent material and at least one refrigerant, characterized in that the sorbent material contains at least one nonvolatile organic salt which is liquid under standard conditions, or a mixture of organic salts, with the proviso that this is liquid under standard conditions, wherein the salt or the mixture has a thermal stability above 150° C.

27 Claims, 1 Drawing Sheet

Figure 1:
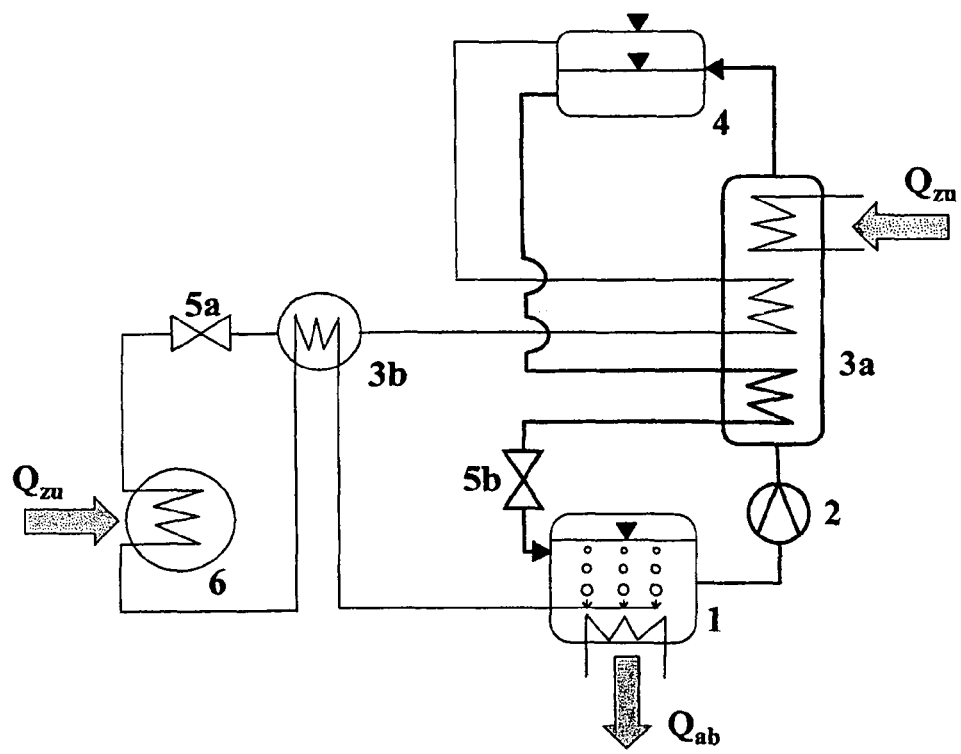

Advantageous embodiments of the process according to the invention
1: Absorber, 2: Pump, 3a, 3b: Heat exchanger,
4: Settler, 5a, 5b: Throttle, 6: Evaporator

FOREIGN PATENT DOCUMENTS

| | | |
|---|---|---|
| DE | 103 33 546 | 2/2005 |
| DE | 10 2004 053 167 | 5/2006 |
| DE | 10 2005 013 030 | 9/2006 |
| JP | 61-129019 | 6/1986 |
| JP | 2-298767 | 12/1990 |
| JP | 4-268176 | 9/1992 |
| JP | 7-167521 | 7/1995 |
| WO | WO 93/13367 | 7/1993 |
| WO | WO 02/074718 | 9/2002 |
| WO | WO 03/074494 | 9/2003 |
| WO | WO 2004/104496 | 12/2004 |
| WO | WO 2005/113702 A1 | 12/2005 |
| WO | WO 2006/084262 | 8/2006 |
| WO | WO 2009/097930 | 1/2009 |
| WO | WO 2009/098155 | 8/2009 |

OTHER PUBLICATIONS

English language translation of the Written Opinion of the International Searching Authority for PCT/EP2006/062567 filed May 24, 2006.
Brennecke, et al., "Ionic Liquids: Innovative Fluids for Chemical Processing," *AIChE Journal* 47(11):2384-2389 (2001).
Ziegler, et al., "Multi-effect absorption chillers," *Rev. Int. Froid* 16(5):301-311 (1993).
English language text for DE 400 488 listed as document B1 above.
English language text for DE 633 146 listed as document B2 above.
English language abstract for DE 195 11 709 listed as document B3 above.
English language abstract for DE 103 33 546 listed as document B4 above.
English language abstract for DE 10 2004 053 167 listed as document B5 above.
English language abstract for JP 61-129019 listed as document B7 above.
English language abstract for JP 2-298767 listed as document B8 above.
English language abstract for JP 4-268176 listed as document B9 above.
English language abstract for JP 7-167521 listed as document B10 above.
English language abstract for WO 93/13367 listed as document B11 above.
English language abstract for WO 2009/097930 listed as document B16 above.
English language abstract for WO 2009/098155 listed as document B17 above.
International Search Report for PCT/EP2006/062567 filed May 24, 2006.
Written Opinion of the International Searching Authority for PCT/EP2006/062567 filed May 24, 2006.
Chua, et al., "Improved Thermodynamic Property Fields of LiBr-$H_2O$ Solution," *International Journal of Refrigeration* 23:412-429 (2000).
Glebov, et al., "Experimental Study of Heat Transfer Additive Influence on the Absorption Chiller Performance," *International Journal of Refrigeration* 25:538-545 (2002).
Kim, et al., "Performance Evaluation of Absorption Chiller Using LiBr + $H_2N(CH_2)_2OH$ + $H_2O$, LiBr + $HO(CH_2)_3OH$ + $H_2O$, and LiBr + ($HOCH_2CH_2NH$ + $H_2O$ as Working Fluids," *Applied Thermal Engineering* 19:217-225 (1999).
Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (2004).
Wu, et al., "Novel Ionic Liquid Thermal Storage for Solar Thermal Electric Power Systems," *Proceeding of Solar Forum. Solar Energy: The Power to Choose* Apr. 21-25 (2001).
Yoon, et al., "Cycle Analysis of Air-Cooled Absorption Chiller Using a New Working Solution," *Energy* 24:795-809 (1999).
Ziegler, et al., "Heat-Transfer Enhancement by Additives," *International Journal of Refrigeration* 19:301-309 (1996).
English abstract for reference B1, DE 36 23 680.
English abstract for reference B2, WO 2005/113702.
International Preliminary Report on Patentability for PCT/EP2006/062567 filed May 24, 2006.

Advantageous embodiments of the process according to the invention
1: Absorber, 2: Pump, 3a, 3b: Heat exchanger,
4: Settler, 5a, 5b: Throttle, 6: Evaporator

WORKING MEDIA FOR REFRIGERATION PROCESSES

CROSS REFERENCE TO RELATED APPLICATIONS

The present application is U.S. national stage of international application PCT/EP2006/062567, which had an international filing date of May 24, 2006, and which was published in German under PCT Article 21(2) on Dec. 21, 2006. The international application claims priority to German application 10 2005 028 451.5, filed on Jun. 17, 2005. These prior applications are hereby incorporated by reference in their entirety.

The invention relates to novel working media for refrigeration processes and describes, in particular, the use of organic salts as additive which are ideally liquid under standard conditions or at temperatures <60° C. or sorbent material for refrigeration processes. The use of the substances used or co-used according to the invention as additive or sorbent material leads to improvements of the properties of the working medium. In addition, the invention comprises novel method variants for refrigeration processes having advantages over the prior art.

PRIOR ART

Refrigeration processes or refrigerating machines in this invention are taken to mean heat pumps, vapor-compression refrigerators, absorption refrigerators, vapor-jet refrigerators and further sorption refrigerating machines such as resorption and adsorption refrigerating machines of continuous and periodic mode of operation and also diffusion refrigerating machines, as described in Vauck, W. R. A. and Müller, H. A., Grundoperationen chemischer Verfahrenstechnik [Unit operations of chemical process engineering], 10th edition, Leipzig 1994, ISBN 3-342-00629-3 and in Lueger, Lexikon der Technik [Technical lexicon]: volume 16 Lexicon of process engineering, 4th edition, Stuttgart 1970.

In general a refrigerating machine or heat pump is based on circulating a working medium (also termed refrigerant) wherein heat is supplied or removed at various pressure levels. The basic principle is described by what is termed a reversed Clausius-Rankine cycle and is therefore a direct reversal of a heat engine. In this case the refrigerant passes through the working steps (a) compression, (b) condensation, (c) expansion and (d) evaporation.

In this case heat is elevated from a lower temperature level to a higher temperature level. The aim in this case is, with a predetermined expenditure of mechanical, electrical or thermal energy, to elevate an amount of heat which is as large as possible to a higher temperature level and there remove it. It is possible in this case to effect the change in temperature or pressure level by one single stage or a plurality of stages.

The difference between refrigerating machines and heat pumps results from the temperature level used. In the case of heat pumps the heat arising at a high temperature level (generally at the condenser) is utilized, for example for heating purposes, whereas in a refrigerating machine the heat to be supplied (generally at the evaporator) is used for cooling purposes.

Heat pumps can also be designed in the form of high-temperature heating value technology, wherein the heat of condensation of the water vapor present in the flue gases is used above the flue gas dew point. In this case a part of the water vapor in the exhaust gas is taken up by a hygroscopic scrubbing solution (for example LiBr solution) in an absorber and is subsequently expelled again at a higher temperature in a desorber. Not only the water vapor expelled from cooling and condensation but also the heat arising from cooling the scrubbing solution before recirculation to the absorber can then be utilized at a high temperature level.

Vapor-compression refrigerators or compression refrigerating machines characteristically lead to the above described circulation process using mechanical compressors. These compress the refrigerant which is present at least in part in the vaporous or supercritical state.

Vapor-jet refrigerators have vapor-jet compressors instead of mechanical compressors and use water as refrigerant. They evaporate a part of the water at a low operating pressure and remove the heat of evaporation from the residual water, which can be used as a cold source. Vapor-jet refrigerators can also be designed as open processes.

In absorption refrigerating machines, characteristically in the above described circulation process at least one stage of the mechanical compression of the vaporous refrigerant is replaced by what is termed thermal compression (alternative compression). This consists of the absorption of the vaporous refrigerant in an absorption medium, compression of the resultant liquid compositions of matter and subsequent heat supply by expelling the refrigerant at a high pressure level.

There are differing designs of absorption refrigerating machines and heat pumps, as described in Lueger, Lexikon der Technik: volume 16 Lexicon of process engineering, 4th edition, Stuttgart 1970, and in the review papers by Ziegler, F., Int. J. Therm. Sci. 38 (1999) 191-208, Wongsuwan, W. et al., Applied Thermal Engineering 21 (2001) 1489-1519 and Cheung, K. et al., International Journal of Refrigeration 19 (1996) 473-481. All absorption refrigerating machines are based on using what is termed a working medium consisting of a refrigerant and a sorbent material (also termed absorbent or absorption liquid). The sorbent material must be liquid in the case of continuously operating sorption refrigerating machines, wherein the concentration of the refrigerant in the absorption liquid is dependent on the absorption capacity, the pressure and temperature. Within the pressure and temperature range through which refrigerant and sorbent material pass in sorption refrigerating machines, both substances must be miscible, in which case they must not form an azeotrope. One or more additives can also be admixed to the working medium with the purpose of improving the absorption capacity, the heat capacity or the heat transfer, and also of reducing the solidification temperature of the working medium and occurrences of decomposition. The ideal working medium, according to Lueger, Lexikon der Technik: volume 16 Lexicon of process engineering, 4th edition, Stuttgart 1970, consists of a refrigerant having a flat vapor-pressure curve and therefore comparatively small pressure differences in the system, high heat of evaporation and a sorbent material having a vapor pressure as low as possible, low solidification temperatures, low specific heat capacity and also a small enthalpy of mixing. In addition, an advantageous working medium should be chemically and thermally stable, non-toxic, nonflammable, not environmentally hazardous and noncorrosive. As described in Lueger, Lexikon der Technik: volume 16 Lexicon of process engineering, 4th edition, Stuttgart 1970, the most important working media employed in practice consist of (a) ammonia as refrigerant and water as sorbent material or (b) water as refrigerant and sulfuric acid or an aqueous lithium bromide solution or an aqueous lithium chloride solution as sorbent material or (c) methylamine or dimethylamine or ethylamine as refrigerant and water as sorbent material or (d) hydrocarbons such as ethane or propane as refrigerant and higher-boiling hydrocarbons as sorbent material. The working group of Nezu [Nezu, Y.; Hisada, N.; Ishiyama, T.; Watanabe, K. Thermodynamic properties of working-fluid pairs with R-134a for absorption refrigeration system. Natural Working Fluids 2002, IIR Gustav Lorentzen Conference, 5th, Guangzhou, China, Sep. 17-20, 2002 (2002), 446-453. CODEN: 69EZUG CAN 140:113462 AN 2004:79935 CAPLUS] has proposed, for the use of (e) halogenated hydrocarbons such as, for example, R134a ($CF_3$—$CH_2$—F) as refrigerant, N,N-dimethylformamide or N,N-dimethylacetamide as sorbent material. Kim, K.-S. et al., in their papers (1) "*Ionic Liquids as new working fluids for use in absorption heat pumps or chillers*" (fifteenth symposium on thermophysical properties, Boulder, Colo., USA, Jun. 22-27, 2003) and (2) "*Refractive index and heat capacity of 1-butyl-3-methylimidazolium bromide and 1-butyl-3-methyl-imidazolium tetrafluoroborate and vapor pressure of binary systems for 1-butyl-3-methylimidazolium bromide+trifluoroethanol and 1-butyl-3-methyl-imidazolium tetrafluoroborate+trifluoroethanol*" Fluid Phase Equilibria 218 (2004) 215-220 propose working media having (f) 2,2,2-trifluoroethanol as refrigerant and 1-butyl-3-methylimidazolium tetrafluoroborate or 1-butyl-3-methylimidazolium bromide as sorbent material.

The working medium, in the context of this invention, is taken to mean the maximum number of system components occurring at least one site of the refrigeration process. In the case of absorption refrigerators, the working medium is therefore a mixture consisting of sorbent material and refrigerant and, if appropriate, additions of additives. In the case of refrigerators or heat pump systems, in the context of this invention the working medium may be taken to mean any mixture which is compressed in the compressor.

For improvement of the properties of a working medium, additives can be added, as described by way of example in Kim, J.-S. et al., Applied Thermal Engineering 19 (1999) 217-225 or Glebov, D. and Setterwall, F., International Journal of Refrigeration 25 (2002) 538-545 or Ziegler, F. and Grossman, G., International Journal of Refrigeration 19 (1996) 301-309.

Kim, J.-S. et al., Applied Thermal Engineering 19 (1999) 217-225 and Chua, H. T. et al., International Journal of Refrigeration 23 (2000) 412-429 and also Yoon, J.-I. and O.-K. Kwon, Energy 24 (1999) 795-809 propose, for example, as additive to the above described working medium for absorption refrigerating machines LiBr+$H_2O$, the following substances: (a) $H_2N(CH_2)_2OH$, (b) $HO(CH_2)_3OH$ or (c) $(HOCH_2)_2NH$.

Disadvantages of the prior art are that the known working media exhibit a limited absorption behavior or contain substances which have too high a crystallization temperature, have a high hazard potential (due to toxicity or flammability), possess environmentally polluting properties (for example by damage to the ozone layer or a high greenhouse potential), are corrosive or have a very high vapor pressure. Frequently, the working media, after compression in absorption refrigerating machines, may only be separated very incompletely into refrigerant and sorbent material, since conventional high-melting sorbent materials (such as, for example, lithium bromide) crystallize out in the concentrated state. Low-melting sorbent materials (such as, for example, N,N-dimethylformamide) generally possess a significant volatility which, at high concentration of the sorbent material, leads to a contamination of the refrigerant, as a result of which the installation of further separation apparatuses downstream of the expeller becomes necessary. The recycling of insufficiently concentrated sorbent materials from the expeller back to the absorber is disadvantageous, however, since the sorbent materials there consequently can take up only correspondingly small amounts of refrigerant and therefore undesirably large and also energetically disadvantageous circulation streams result.

It was the object of the present invention to find a working medium which is suitable for use in refrigeration processes and/or refrigerating machines, in particular in absorption heat pumps, absorption refrigerating machines, vapor-jet refrigerating machines, compression refrigerating machines and/or heat transformers, and which does not have at least one of said disadvantages, preferably does not have as many as possible of said disadvantages.

In addition, it was the object to find a sorbent material which has a sufficiently low vapor pressure in order to avoid as far as possible problems in separation of matter, which is stable at the temperatures to be expected, which is miscible as well as possible with the refrigerant such as, for example, water, ammonia or trifluoroethanol, and also can absorb this in a suitable manner.

In addition, it is advantageous to find a sorbent material which is liquid as far as possible in the entire temperature range under consideration in order thereby to prevent crystallization problems and in order to be able to remove as far as possible all of the refrigerant such as, for example, water, ammonia or trifluoroethanol, present in the sorbent material and utilize it.

These objects and also other objects which, although not stated explicitly, but may be derived as obvious from the facts discussed herein or of necessity result therefrom, are solved by the working medium described in claim 1. Expedient modifications of this working medium are brought under protection in the subclaims which refer back to claim 1. The further claims describe particularly suitable fields of application of the working medium according to the invention.

As a result of the fact that a working medium for refrigeration processes and/or refrigerating machines, in particular absorption heat pumps, absorption refrigerating machines, vapor-jet refrigerating machines, compression refrigerating machines, heat pumps and/or heat transformers, contains at least one refrigerant and at least one sorbent material, wherein the sorbent material contains at least one liquid organic salt which is nonvolatile under standard conditions, or a mixture of organic salts with the proviso that this mixture is liquid under standard conditions, and wherein the salt or the mixture has a thermal stability above 150° C., it is possible, in a manner which was not readily predictable, to specify a highly efficient working medium which has, in particular, an improved absorption behavior in refrigeration processes and/or refrigerating machines, especially in absorption heat pumps, absorption refrigerating machines, vapor-jet refrigerating machines, compression refrigerating machines and/or heat transformers, to provide a non-toxic, non-explosive working medium, to make accessible a working medium having a relatively high chemical stability, to reduce the sorbent volatility and as a result the hazard potential and also the separation expenditure, to reduce the energy requirement, to pollute the environment less and/or to avoid the crystallization or corrosion problems known from the prior art.

In particular, it has been found that using ionic liquids, the partial pressure of refrigerants, in particular water, can be significantly lowered, wherein the use of diethylpolypropoxymethylammonium chloride, bis(2-hydroxyethyl)dimethylammonium methylsulfonate and/or 1-ethyl-3-methylimidazolium methanesulfonate has proved very particularly suitable, since it makes possible a reduction by the factor $\geq 4.7$.

The absorption materials of the prior art either crystallize out at high absorbent concentrations ($w_{absorbent} > 80\%$ by mass) or exhibit a significantly lower refrigerant partial pressure lowering (factor <4.7).

According to the publication F. Hillerns; *Thermophysikalische Eigenschaften and Korrosions-verhalten von Kälteträgern* [Thermophysical properties and corrosion behavior of cold sources]; Die Kälte & Klimatechnik (October 1999) 110-114 higher volumetric heat capacities (heat capacity $c_p$·density $\rho$) lead to greater transferable heat quantities and therefore to more compact plants and also to lower capital costs. The reduction of the dynamic viscosity ($\eta$) substantially determines the flow behavior and the pressure drop within the heat exchanger and piping of the plant. The lower the viscosity of the fluid is, the smaller is the required pump performance for maintaining the turbulent flow form which is necessary for efficient heat transfer in the heat exchangers.

The working medium according to the invention contains at least one refrigerant. Refrigerants which are particularly suitable for the purposes of the present invention are those substances which take up heat in a system producing cold by evaporation at low temperature and low pressure and release heat by liquefaction at higher temperature and higher pressure. They are specified in more detail in the standard DIN 8962 of August 1968 ("Refrigerants").

The refrigerant expediently has an enthalpy of evaporation $\geq 300$ kJ/kg, particularly preferably $\geq 350$ kJ/kg.

The best results are achieved with water, methanol, ammonia, trifluoroethanol, preferably linear hydrocarbons, in particular ethane and propane, alkylamines, in particular methylamine, dimethylamine and ethylamine, and halogenated refrigerants such as, for example, difluoroethane, trifluoroethane, tetrafluoroethane and pentafluoroethane. In this case refrigerants having a water solubility of at least 1.0 g, preferably at least 5.0 g, particularly preferably at least 10.0 g, in particular at least 20.0 g, in each case based on 100.0 g of water, measured at 25° C., and especially water, trifluoroethanol and/or ammonia, have proved very particularly useful.

In the context of a further particularly preferred embodiment of the present invention, use is made of alkanes, in particular ethane and/or propane, as refrigerant.

The refrigerants can be used in each case individually, or else as a mixture of two or more of the abovementioned components.

The working medium of the invention in addition contains at least one sorbent material. Sorbent materials are the organic salts or salt mixtures which are preferably liquid under standard conditions, and are characterized in more detail hereinafter.

The expression "liquid organic salts" is taken to mean salts, preferably organic salts, having a melting point of below 100° C., particularly preferably organic salts which are already present in the liquid state of matter under use conditions, preferably under standard conditions (20° C., 1.013 mbar). The definition shall also comprise mixtures of solid salts and liquid organic salts which are liquid under use conditions, preferably under standard conditions.

Generally, liquid organic salts are distinguished by favorable properties, in particular with respect to a potential use as solvents, and are considered a novel class of solvents and selective aids. Liquid organic salts possess, under moderate conditions, an extremely low vapor pressure with simultaneously relatively low solution viscosities so that they can be highly concentrated in the expeller when used as sorbent material in sorption refrigerating machines, and low traces or no traces of liquid organic salts must be detected in the refrigerant. In addition, liquid organic salts, as a result of their combinatorial variety, which results by varying the anions and cations, are a particularly flexible sorbent material concept which, by choice of suitable combinations and concentrations, may be matched exactly to the technical problems to be solved.

Organic salts which are liquid under standard conditions consist in most cases of anions such as, for example, hydroxide, halides, carboxylates, phosphates, thiocyanate, isothiocyanate, dicyanamide, sulfate, alkyl sulfates, sulfonates, alkylsulfonates, tetrafluoroborate, hexafluorophosphate or else bis(trifluoromethylsulfonyl)imide combined with, for example, substituted ammonium, phosphonium, pyridinium or imidazolium cations, wherein the abovementioned anions and cations are a small selection from the great number of possible anions and cations and therefore no claim of completeness is made or certainly any restriction is intended to be given.

The organic salts preferably used as sorbent material, which are ideally liquid under standard conditions, consist of at least one cation of the general formulae:

$$R^1R^2R^3R^4N^{\oplus} \quad (1)$$

$$R^1R^2N^{\oplus}=CR^3R^4 \quad (2)$$

$$R^1R^2R^3R^4P^{\oplus} \quad (3)$$

$$R^1R^2P^{\oplus}=CR^3R^4 \quad (4)$$

where
$R^1$, $R^2$, $R^3$, $R^4$ are identical or different and are hydrogen, a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, an alkylaryl radical having 7 to 40 carbon atoms, a linear or branched aliphatic hydrocarbon radical having 2 to 30 carbon atoms, if appropriate containing double bonds, and interrupted by one or more heteroatoms (oxygen, NH, NR', where R' is equal to a $C_1$- to $C_{30}$-alkyl radical, if appropriate containing double bonds, in particular $CH_3$), a linear or branched aliphatic hydrocarbon radical having 2 to 30 carbon atoms, if appropriate containing double bonds, and interrupted by one or more functionalities selected from the group —O—C(O)—, —(O)C—O—, —NH—C(O)—, —(O)C—NH—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, a linear or branched aliphatic or cycloaliphatic hydrocarbon radical having 1 to 30 carbon atoms, if appropriate containing double bonds, functionalized at the terminus with OH, OR', NH$_2$, N(H)R', N(R')$_2$ (where R' is equal to a $C_1$- to $C_{30}$-alkyl radical, if appropriate containing double bonds), or a polyether according to —(R$^5$—O)$_n$—R$^6$ made up blockwise or in a statistical distribution,
wherein
$R^5$ is a linear or branched hydrocarbon radical containing 2 to 4 carbon atoms,
n is 1 to 100, preferably 2 to 60, and
$R^6$ is hydrogen, a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, an alkylaryl radical having 7 to 40 carbon atoms, or a radical —C(O)—R$^7$ where R$^7$ is equal to a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, an alkylaryl radical having 7 to 40 carbon atoms.

Cations which come into consideration are, in addition, ions which are derived from saturated or unsaturated cyclic compounds and also aromatic compounds each having at least one trivalent nitrogen atom in a 4- to 10-, preferably 5- to 6-membered heterocyclic ring, which may if appropriate be substituted. Such cations may be described in simplified form (that is to say without stating the exact position and number of double bonds in the molecule) by the general formulae (5), (6) and (7) hereinafter, wherein the heterocyclic rings if appropriate can also contain a plurality of heteroatoms.

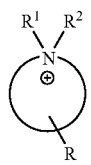

(5)

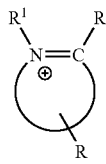

(6)

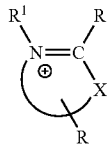

(7)

R$^1$ and R$^2$ have the abovementioned meaning in this case,

R is a hydrogen, a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, or an alkylaryl radical having 7 to 40 carbon atoms and X is an oxygen atom, a sulfur atom, or a substituted nitrogen atom (X=O, S, NR').

Examples of cyclic nitrogen compounds of the abovementioned type are pyrrolidine, dihydropyrrole, pyrrole, imidazoline, oxazalonine, oxazole, thiazoline, thiazole, isoxazole, isothiazole, indole, carbazole, piperidine, pyridine, the isomeric picolines and lutidines, quinoline and isoquinoline. The cyclic nitrogen compounds of the general formulae (5), (6) and (7) can be unsubstituted (R=H), monosubstituted or else polysubstituted by the radical R, wherein, in the case of a polysubstitution by R, the individual radicals R can be different.

Cations which come into consideration are, in addition, ions which are derived from saturated acyclic, saturated or unsaturated cyclic compounds, and also from aromatic compounds each having more than one trivalent nitrogen atom in a 4- to 10-, preferably 5- to 6-membered heterocyclic ring.

These compounds can be substituted not only on the carbon atoms, but also on the nitrogen atoms. They can in addition be annelated by, if appropriate substituted, benzene rings and/or cyclohexane rings, with formation of polynuclear structures. Examples of such compounds are pyrazole, 3,5-dimethylpyrazole, imidazole, benzimidazole, N-methylimidazole, dihydropyrazole, pyrazolidine, pyridazine, pyrimidine, pyrazine, pyridazine, 2,3-, 2,5- and 2,6-dimethylpyrazine, cinnoline, phthalazine, quinazoline, phenazine and piperazine. In particular, cations of the general formula (8) derived from imidazole and its alkyl and phenyl derivatives have proved useful as component of an ionic liquid.

Cations which come into further consideration are ions which contain two nitrogen atoms and are represented by the general formula (8)

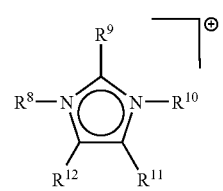

(8)

where

R$^8$, R$^9$, R$^{10}$, R$^{11}$, R$^{12}$ are identical or different and are hydrogen, a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, an alkylaryl radical having 7 to 40 carbon atoms, a linear or branched aliphatic hydrocarbon radical having 1 to 30 carbon atoms which, if appropriate, contains double bonds and is interrupted by one or more heteroatoms (oxygen, NH, NR' where R' is equal to a C$_1$- to C$_{30}$-alkyl radical, if appropriate containing double bonds), a linear or branched aliphatic hydrocarbon radical having 1 to 30 carbon atoms, which if appropriate contains double bonds and is interrupted by one or more functionalities selected from the group —O—C(O)—, —(O)C—O—, —NH—C(O)—, —(O)C—NH—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, a linear or branched aliphatic or cycloaliphatic hydrocarbon radical having 1 to 30 carbon atoms which, if appropriate, contains double bonds and is functionalized at the terminus with OH, OR', NH$_2$, N(H)R', N(R')$_2$ where R' is equal to a C$_1$- to C$_{30}$-alkyl radical, if appropriate containing double bonds, or a polyether based on —(R$^5$—O)$_n$—R$^6$, which is made up in a blockwise manner or in a statistical distribution, wherein R$^5$ is a linear or branched hydrocarbon radical containing 2 to 4 carbon atoms, n is 1 to 100, and R$^6$ is hydrogen, a linear or branched aliphatic hydrocarbon radical having 1 to 30 carbon atoms, if appropriate containing double bonds, a cycloaliphatic hydrocarbon radical having 5 to 40 carbon atoms, if appropriate containing double bonds, an aromatic hydrocarbon radical having 6 to 40 carbon atoms, an alkylaryl radical having 7 to 40 carbon atoms, or is a radical —C(O)—R$^7$ where R$^7$ is equal to a linear or branched aliphatic hydrocarbon radical having 1 to 30 carbon atoms, which, if appropriate, contains double bonds, a cycloaliphatic hydrocarbon radical having 5 to 40 carbon atoms which contains, if appropriate, double bonds, an aromatic hydrocarbon radical having 6 to 40 carbon atoms, an alkylaryl radical having 7 to 40 carbon atoms.

The liquid organic salts preferably used according to the invention consist of at least one of the abovementioned cations combined with at least one of the anions hereinafter.

Preferred anions are selected from the group of the hydroxyl ions or a hydroxide anion, halides, bis(perfluoroalkylsulfonyl)amides, alkyl and aryl tosylates, fluoroalkyl tosylates, haloantimonate, nitrates, sulfates, hydrogensulfates, alkyl and aryl sulfates, polyether sulfates and polyethersulfonates, fluoroalkyl sulfates, sulfonates, alkyl and arylsulfonates, fluorinated alkyl and arylsulfonates, alkyl and aryl carboxylates, fluoroalkyl carboxylates, chlorates, borates, cyanates, chloroaluminates, halocuprates, halozincates, haloaluminates, saccharinates, anion of dicyanamide, preferably anions of compounds hydroxide (OH$^-$), dicyanamide, chloride, phosphate, polyetherphosphates, alkylsulfonates, alkyl sulfates, alkyl carboxylates, in particular acetate.

It is in addition preferred that the organic salts used as sorbent material preferably have a viscosity as specified in DIN 53 019 at 20° C. in a range from 1 to 15 000 mPa·s, preferably from 2 to 10 000 mPa·s, particularly preferably in a range from 5 to 5000 mPa·s, and furthermore, preferably in a range from 10 to 3000 mPa·s. In addition, it is preferred that the organic salts are liquid at a temperature of 50° C. and have a viscosity of less than 3000 mPa·s, particularly preferably less than 2000 mPa·s, and further preferably less than 1000 mPa·s.

The above described liquid organic salts can be used alone or as a mixture of at least two different organic salts. Further liquid organic salts preferred according to the invention and also processes for production thereof are described in Angewandte Chemie, 2000, 112, pp. 3926-3945. The disclosure of this paper is hereby incorporated by reference and is considered part of the disclosure of the present invention.

Sorbent materials which are particularly preferred for the purposes of the present invention comprise the following:
distearyldimethylammonium chloride,

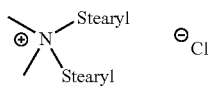

which is available, for example, under the name Tego® IL DS from Degussa AG,
1-methyl-2-nortallowalkyl-3-tallowamidoethylimidazolium methyl sulfate,

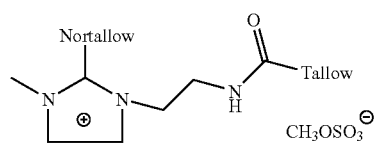

which is available, for example, under the name Tego® IL M90 from Degussa AG,
1-ethyl-3-methylimidazolium ethyl sulfate,

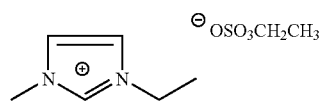

which is available, for example, under the name Tego® IL IMES from Degussa AG,
ethoxylated cocodiethanolammonium chloride,

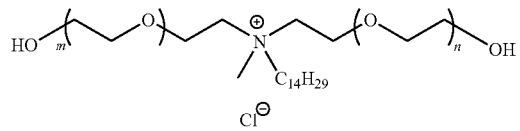

which is available, for example, under the name Tego® IL K5 from Degussa AG,
ethoxylated cocoamine, quaternized with dimethyl sulfate,

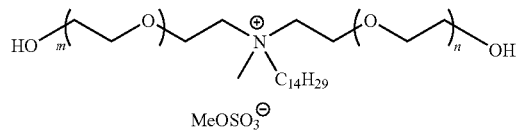

which is available, for example, under the name Tego® IL K5MS from Degussa AG,
diethylpolypropoxyhydroxyethylammonium phosphate,

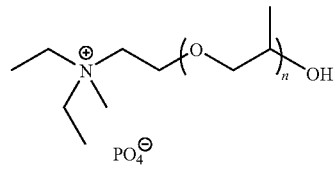

which is available, for example, under the name Tego® IL P51P from Degussa AG,
diethylpolypropoxyhydroxyethylammonium acetate,

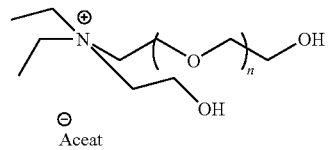

which is available, for example, under the name Tego® IL P54A from Degussa AG,
diethylpolypropoxymethylammonium chloride,

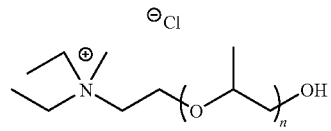

which is available, for example, under the name Tego® IL P9 from Degussa AG,
ethoxylated tallow amine, quaternized with diethyl sulfate,

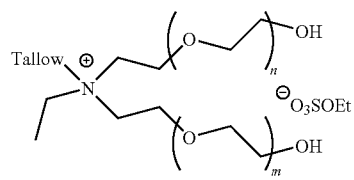

which is available, for example, under the name Tego® IL T16ES from Degussa AG.

In the above formulae, m and n each denote numbers in the range from 1 to 300, preferably in the range from 1 to 200, particularly preferably in the range from 1 to 100.

Further particularly preferred sorbent materials comprise:

bis(2-hydroxyethyl)dimethylammonium chloride, the synthesis of which is described in P. Wasserscheid, T. Welton Ionic Liquids in Synthesis Wiley-VCH ISBN 3-527-30515-7, bis(2-hydroxyethyl)dimethylammonium methylsulfonate, the synthesis of which is described in P. Wasserscheid, T. Welton Ionic Liquids in Synthesis Wiley-VCH ISBN 3-527-30515-7, 1-butyl-3-methylimidazolium chloride (CAS#: 79917-90-1), which is available, for example, under the name Basionic® ST 70 from BASF AG, 1-ethyl-3-methylimidazolium chloride (CAS#: 65039-09-0), 1-ethyl-3-methylimidazolium acetate (CAS#: 143314-17-4), N-methylpyrrolinium acetate, the synthesis of which is described in P. Wasserscheid, T. Welton Ionic Liquids in Synthesis Wiley-VCH ISBN 3-527-30515-7, N-methylpyrrolinium chloride, the synthesis of which is described in P. Wasserscheid, T. Welton Ionic Liquids in Synthesis Wiley-VCH ISBN 3-527-30515-7, 1-butyl-4-methylpyridinium chloride, the synthesis of which is described in P. Wasserscheid, T. Welton Ionic Liquids in Synthesis Wiley-VCH ISBN 3-527-30515-7, 1,3-dimethylimidazolium dimethylphosphate, which is obtainable, for example, under the name ECOENG1111P® from Solvent Innovation GmbH, 1-ethyl-3-methylimidazolium ethyl sulfate (CAS#: 342573-75-5), 1-ethyl-3-methylimidazolium methylsulfonate (CAS#: 342789-815), 1-ethyl-3-methylimidazolium hydroxide, the synthesis of which can be carried out based on fundamentals described in P. Wasserscheid, T. Welton Ionic Liquids in Synthesis Wiley-VCH ISBN 3-527-30515-7.

A further group of particularly expedient sorbent materials comprises:

1-butyl-3-methylimidazolium methanesulfonate (CAS#: 342789-81-5), which is available, for example, under the name Basionic® ST 78 from BASF AG, methyl-tri-n-butylammonium methyl sulfate (CAS#: 13106-24-6), which is available, for example, under the name Basionic® ST 62 from BASF AG, 1,2,4-trimethylpyrazolium methyl sulfate, which is available, for example, under the name Basionic® ST 33 from BASF AG, 1-ethyl-2,3-dimethylimidazolium ethyl sulfate (CAS#: 516474-08-01), which is available, for example, under the name Basionic® ST 67 from BASF AG, 1,2,3-trimethylimidazolium methyl sulfate (CAS#: 65086-12-6), which is available, for example, under the name Basionic® ST 99 from BASF AG, methylimidazolium chloride (CAS#: 35487-17-3), which is available, for example, under the name Basionic® AC 75 from BASF AG, methylimidazolium hydrogensulfate (CAS#: 681281-87-8), which is available, for example, under the name Basionic® AC 39 from BASF AG, 1-ethyl-3-methylimidazolium hydrogensulfate (CAS#: 412009-61-1), which is available, for example, under the name Basionic® AC 25 from BASF AG, 1-butyl-3-methylimidazolium hydrogensulfate (CAS#: 80432-05-9), which is available, for example, under the name Basionic® AC 28 from BASF AG, 1-butyl-3-methylimidazolium acetate (CAS#: 284049-75-8), which is available, for example, under the name Basionic® BC 02 from BASF AG, 1-butyl-3-methylimidazolium methyl sulfate (CAS#: 401788-98-5), which is available, for example, under the name Basionic® LQ 02 from BASF AG, 1-ethyl-3-methylimidazolium thiocyanate (CAS#: 331717-63-6), which is available, for example, under the name Basionic® ST VS 01 from BASF AG, 1-butyl-3-methylimidazolium thiocyanate (CAS#: 344790-87-0), which is available, for example, under the name Basionic® ST VS 02 from BASF AG, choline acetate (CAS#: 14586-35-7), which is available, for example, under the name Basionic® FS 85 from BASF AG, choline salicylate (CAS#: 2016-36-6), which is available, for example, under the name Basionic® FS 65 from BASF AG, tris(2-hydroxyethyl)methylammonium methyl sulfate (CAS#: 29463-06-7), which is available, for example, under the name Basionic® FS 01 from BASF AG.

In addition, the use of the following sorbent materials is particularly expedient:

1-ethyl-3-methylimidazolium dicyanamide,
N-ethyl-N-methylpyrrolidinium dicyanamide,
N-propyl-N-methylpyrrolidinium dicyanamide,
N-butyl-N-methylpyrrolidinium dicyanamide,
N-hexyl-N-methylpyrrolidinium dicyanamide,
N-pentyl-N,N,N-triethylammonium dicyanamide,
N-hexyl-N,N,N-triethylammonium dicyanamide,
N-hexyl-N,N,N-tributylammonium dicyanamide,
1-methyl-3-methylimidazolium lactate,
1-ethyl-3-methylimidazolium lactate,
1-propyl-3-methylimidazolium lactate,
1-butyl-3-methylimidazolium lactate,
1-butoxy-3-methylimidazolium lactate.

Synthesis of the above dicyanamides is described in the publication D. R. MacFarlane et al.; *Ionic liquids based on imidazolium, ammonium and pyrrolidinium salts of the dicyanamide anion*; Green Chemistry 4 (2002) 444-448. For synthesis of the above lactates, reference is made to the publication J. Pernak, I. Gok; *New Ionic Liquids with Organic Anions*; Polish J. Chem. 77 (2003) 975-984.

A further group of preferred ionic liquids comprises:
1-ethyl-3-methylimidazolium nitrate,
1-ethyl-3-methylimidazolium tosylate,
1-ethyl-3-methylimidazolium bromide,
1-allyl-3-methylimidazolium chloride,
1-methyl-3-propylimidazolium iodide,
1-butyl-1-methylpyrrolidinium dicyanamide and
tributylmethylphosphonium methyl sulfate (CYPHOS®), which are available, for example, from Ionic Liquids Technologies.

Valuable instructions on preparation of the above ionic liquids can be found, in particular, in the publication. P. Wasserscheid, T. Welton *Ionic Liquids in Synthesis* Wiley-VCH, ISBN 3-527-30515-7.

The ionic liquid or mixture of ionic liquids used according to the invention is distinguished by a thermal stability above 150° C. The thermal stability can be determined in a manner known per se. However, thermogravimetry has proved particularly suitable, wherein, preferably, the procedure as described in N. Bicak *A new ionic liquid: 2-hydroxy ethylammonium formiate* is followed and measurements are made with a Shimadzu TG-50 and a heating rate of 10° C./min under a nitrogen atmosphere (nitrogen flow rate: 23 ml/min). Under these conditions, thermostable ionic liquids preferably show a weight reduction of less than 50%, particularly preferably less than 30%, expediently less than 20%, still more preferably less than 10%, and in particular less than 5%, in each case based on the starting weight.

The working medium according to the invention has a comparatively high storage stability. After storage at 70° C. for 8000 h, the degradation of the working medium is preferably a maximum of 5%, more preferably a maximum of 4%, particularly preferably a maximum of 3%, in each case based on the starting composition, that is to say preferably at least 95%, more preferably at least 96%, particularly preferably at least 97%, of the components are chemically identical.

Testing with respect to chemical identity can proceed on the basis of conventional methods. Infrared spectroscopy, NMR and mass spectroscopy studies have proven themselves very particularly in this context.

The storage of the working medium is preferably carried out under conditions customary for use, particularly preferably under air- and moisture-free conditions.

The working medium of the invention is relatively harmless from health aspects. Preferably, it has an $LD_{50}$ value greater than 1000 mg/kg, particularly preferably greater than 1500 mg/kg, in particular greater than 2000 mg/kg, and/or an $EC_{50}$ value greater than 50 mg/l, particularly preferably greater than 75 mg/l, in particular greater than 100 mg/l. Expediently, both criteria are met at the same time.

In addition, the working medium of the invention is significantly less corrosive than the working media previously known from the prior art. It is expediently distinguished in that, in the glassware corrosion test as specified in ASTM D1384, it exhibits a maximum erosion of 5 $g/m^2$, preferably a maximum of 3 $g/m^2$, particularly preferably a maximum of 2 $g/m^2$.

In this test, exactly weighed metal coupons, provided with a borehole, preferably metal coupons made of copper, soft solder, brass, steel, cast iron or cast aluminum, are arranged in a rack one after the other on an insulated rod. Copper, soft solder and brass are in each case electrically connected by brass spacers, steel, cast iron and cast aluminum are in each case electrically connected by steel spacers, but the resultant "bundles" are insulated from one another. The test body is brought into the medium and the batch is heated to 88° C. for 14 days with introduction of air to increase the corrosion rate. Subsequently the coupons are cleaned, weighed again and the erosion is determined.

In the context of a first particularly preferred variant of the present invention, the erosion measurement is carried out using soft solder coupons. In the context of a second particularly preferred variant of the present invention, the erosion measurement is carried out using cast aluminum coupons.

The working medium of the invention, furthermore, has a significantly improved absorption capacity. In particular, organic salts or salt mixtures significantly reduce the partial vapor pressure of the refrigerant, wherein the decrease in partial pressure of the refrigerant, measured at 30° C. for a composition consisting of 90 mass % organic salt or salt mixture and 10 mass % refrigerant, compared with the vapor pressure of the refrigerant at 30° C., is preferably at least the factor 1.5, expediently at least the factor 3, more preferably at least the factor 4, particularly preferably at least the factor 5, still more preferably at least the factor 6, and in particular at least the factor 7.

The working medium of the invention can be produced in a manner known per se by mixing the components.

Possible fields of application of the working medium of the invention are immediately obvious to those skilled in the art. It is suitable in principle for all refrigeration processes and/or refrigerating machines and is preferably used in absorption heat pumps, absorption refrigerating machines, vapor-jet refrigerating machines, heat pumps, heat transformers or compression refrigerating machines. Particularly suitable fields of application include ventilation or air conditioning, such as, for example, building engineering, automotive engineering, marine engineering, aviation and space travel and container technology, cold stores or refrigerated transporters, such as refrigerating vessels or refrigerating trucks, for transporting foods, gases, chemicals and/or animals, and also the process engineering for air drying, preferably according to the condensation principle, for absorption of gases, central or mobile facilities for heat recovery, such as heating power stations or solar-operated units, refrigerators, freezers and air conditioners.

Expediently, at least one component of the working medium passes through a cyclic process with supply or removal of heat or mechanical energy.

In addition, the ionic liquid expediently acts as sorbent material for the absorption of at least one vaporous or gaseous refrigerant.

The refrigerant and the sorbent material are preferably separated in an expeller and with subsequent condensation of the refrigerant in a cooler with recirculation. The expeller and recirculation cooler of an absorption refrigerator, however, according to an alternative particularly preferred embodiment, can be replaced by at least one apparatus in which a liquid-liquid phase separation proceeds and the two liquid phases are taken off separately. In this case, expediently an absorbent-containing liquid phase having an absorbent concentration of at least 20% by weight, and a refrigerant-containing liquid phase having a refrigerant concentration of at least 20% by weight are formed (see FIG. 1).

The present invention further relates to refrigerating machines, in particular absorption heat pumps, absorption refrigerating machines, vapor-jet refrigerating machines, heat pumps, heat transformers or compression refrigerating machines which contain a liquefier, an expansion element, a heat exchanger and/or an absorber and the working medium of the invention. The refrigerating machines, in particular absorption heat pumps, absorption refrigerating machines, vapor-jet refrigerating machines or compression-refrigerating machines preferably comprise in this case a mixer-settler for liquid-liquid separation of the working medium.

The invention will be illustrated hereinafter by a plurality of examples. In particular, on the basis of experimentally determined equilibrium values and absorption isotherms, the improved property profile of the sorbent materials and additives according to the invention will be verified by means of examples and compared with the prior art.

Absorption isotherms result from the amount of a volatile component (here the refrigerant) which, at a predetermined temperature and at pressures which are generally lower than the vapor pressure of the pure refrigerant; dissolves, in an equilibrium state, in a very high-boiling or nonvolatile liquid (here the sorbent material). The pairs of values of concentration of the liquid binary mixture and the pressure of the volatile component over the liquid at a given temperature thereby give an absorption isotherm. Such absorption isotherms of high-boiling or nonvolatile liquid substances can be measured using various dynamic or static experimental methods of which, here, by way of example reference is made to a dynamic, gravimetric method, as was presented by Sadowski G., Mokrushina L. V., Arlt, W., "Finite and infinite dilution activity coefficients in polycarbonate systems", Fluid Phase Equilibria, 139 (1997) 391-493. In the absorption refrigerating machines considered here, a sorbent material shall absorb the refrigerant after its expansion and vaporization at a low pressure. An advantageous sorbent material, at a given pressure, takes up as much refrigerant as possible, whereupon the volume and the masses of the circulating streams minimize (or lower pressure for the same composition). This leads to the fact that the unit achieves a higher degree of efficiency and can be more advantageous with respect to its dimensions and also the amount of absorber used.

As a measure of the absorption capacity of a sorbent material, as alternative to an absorption isotherm, the Henry constant can also be used. The smaller this is, the greater is the gas solubility in the sorbent material considered. Therefore, a small Henry constant must be sought. For determination of the Henry constant, experimental phase equilibrium data for the respective gas/absorbent system must likewise be used.

The Henry constant $H_{1,2}$ of the dissolved substance 1 in the sorbent material 2 results from the slope of the fugacity for a molar fraction of the component 1 tending toward zero, that is to say simplifies to the saturated vapor pressure of the sorbent material 2 (Gmehling J., Kolbe B., "Thermodynamik" [Thermo-dynamics], ISBN 3-527-28547-4, chapter 4). The various experimental methods for determining the Henry constant are described in Prausnitz J. M., Lichtenthaler R. N., de Azevedo E. G., "Molecular Thermodynamics of Fluid-Phase Equilibria", ISBN 0-13-977745-8; Gmehling J., Kolbe B., "Thermodynamik" [Thermodynamics], ISBN 3-527-28547-4 and Stephan K., Mayinger F., "Thermodynamik" [Thermodynamics], volume 2 Multi-component systems and chemical reactions, ISBN 3-540-54459-3.

Abbreviations of the sorbent materials used:

| | |
|---|---|
| EMIM Cl | 1-ethyl-3-methylimidazolium chloride |
| EMIM OAc | 1-ethyl-3-methylimidazolium acetate |
| MP OAc | N-methylpyrrolinium acetate |
| MP Cl | N-methylpyrrolinium chloride |
| MBP Cl | 1-butyl-4-methylpyridinium chloride |
| Salt A | bis(2-hydroxyethyl)dimethylammonium chloride |
| Salt B | bis(2-hydroxyethyl)dimethylammonium methylsulfonate |
| BMIM BF$_4$ | 1-butyl-3-methylimidazolium tetrafluoroborate |
| BMIM Br | 1-butyl-3-methylimidazolium bromide |
| MMIM MMPO$_4$ | 1,3-dimethylimidazolium dimethyl phosphate, ECOENG1111P ™ |
| EMIM EtSO$_4$ | 1-ethyl-3-methylimidazolium ethyl sulfate |
| EMIM MeSO$_3$ | 1-ethyl-3-methylimidazolium methylsulfonate |
| EMIM OH | 1-ethyl-3-methylimidazolium hydroxide |

EXAMPLE SYSTEM I 2,2,2-Trifluoroethanol as Refrigerant

According to the prior art, only the liquid organic salts 1-butyl-3-methylimidazolium tetrafluoroborate and 1-butyl-3-methylimidazolium bromide are suitable as sorbent materials for 2,2,2-trifluoroethanol. In this case Kim, K. S. et al. describe in "Ionic Liquids as new working fluids for use in absorption heat pumps or chillers" (fifteenth symposium on thermophysical properties, Boulder, Colo., USA, Jun. 22-27, 2003) the absorption capacity of 1-butyl-3-methylimidazolium bromide which is superior to that of 1-butyl-3-methylimidazolium tetrafluoroborate.

Table I hereinafter shows the partial pressure of the refrigerant trifluoroethanol for the respective mass fraction of the ionic liquid. The measurements were carried out at 70° C.

TABLE I

Partial pressure [kPa] of 2,2,2-trifluoroethanol for various sorbent materials

| | Mass fraction of ionic liquid | | | |
|---|---|---|---|---|
| | 0.80 | 0.60 | 0.40 | 0.20 |
| BMIM BF$_4$ | 18.0 | 35.9 | 53.0 | 70.2 |
| BMIM Br | 1.6 | 5.6 | 15.1 | 42.2 |
| EMIM OH | <0.1 | <0.1 | <0.1 | 5.0 |
| EMIM Cl | 0.2 | 1.0 | 4.0 | 19.3 |
| EMIM OAc | 0.2 | 0.8 | 3.7 | 24.7 |
| MBP Cl | 0.3 | 1.3 | 5.0 | 25.2 |
| Salt A | 0.7 | 3.6 | 11.1 | 33.0 |
| Salt B | 1.6 | | | 42.0 |
| MMIM MMPO$_4$ | 0.8 | 3.2 | 10.7 | 39.7 |
| EMIM MeSO$_3$ | 1.2 | 4.6 | 13.5 | 39.7 |

Surprisingly, the organic salts studied (see table I) show that, compared with the prior art, a considerably improved absorption capacity was detected by using 1-ethyl-3-methylimidazolium hydroxide, 1-ethyl-3-methylimidazolium methylsulfonate (EMIM MeSO$_3$), bis(2-hydroxyethyl)dimethylammonium chloride, 4-methyl-N-butylpyridinium chloride (MBP Cl), 1-ethyl-3-methylimidazolium acetate (EMIM OAc) and 1-ethyl-3-methylimidazolium chloride (EMIM Cl).

1-Butyl-3-methylimidazolium bromide (BMIM Br) which is advantageous according to the known prior art has a melting point of 82° C. By using the liquid organic salts which are superior in absorption capacity such as, for example, 1-ethyl-3-methylimidazolium methylsulfonate and 1-ethyl-3-methylimidazolium acetate, in addition, the pure substance melting point of the sorbent material can be lowered by an amount of 47 K to more than 100 K. By using these, preferably liquid, organic salts of the invention, the sorbent material can then be concentrated more greatly in the expeller without having to fear crystallization of the sorbent material. Residues of refrigerant to avoid crystallization are, depending on the temperature in the sorbent material, not at all necessary, or can be significantly lower than in the prior art. As a result, useless circulating streams are minimized and the efficiency increased.

EXAMPLE SYSTEM II

R134a as Refrigerant

Table II hereinafter shows the partial pressure of refrigerant R134a for the respective mass fraction of the sorbent material. The measurements were carried out at 20° C.

TABLE II

Partial pressure [kPa] of R134a for various sorbent materials

| | Mass fraction of the sorbent material | | | |
|---|---|---|---|---|
| | 0.80 | 0.60 | 0.40 | 0.20 |
| N,N-Dimethylformamide | 35 | 97 | 205 | 350 |
| N,N-Dimethylacetamide | 20 | 64 | 166 | 364 |
| EMIM EtSO$_4$ | | | | 360 |
| EMIM OH | 3 | 20 | 112 | 345 |
| EMIM Cl | 7 | 37 | 135 | 327 |
| EMIM OAc | 17 | 66 | 175 | 360 |
| MP OAc | 15 | 74 | 197 | 373 |
| MP Cl | 2 | 23 | 132 | 339 |
| MMIM MMPO$_4$ | 57 | 164 | 303 | 439 |

According to the prior art, for the refrigerant R134a, N,N-dimethylformamide is a very advantageous sorbent material. In the experimentally determined absorption isotherms presented in table II, by means of the selected organic salts 1-ethyl-2,3-dimethylimidazolium acetate (EMMIM OAc) and 1-ethyl-2,3-dimethylimidazolium chloride (EMMIM Cl), a considerably greater absorption capacity is achieved. In addition, according to Yokozeki, A.; Applied Energy 80 (2005); 383-399, the advantageous conventional sorbent material N,N-dimethylformamide has a measurable volatility which can require the installation of additional separation apparatuses downstream of the expeller for separating off sorbent material residues from the refrigerant. In addition to the greater absorption capacity, a further advantage of the liquid organic salts of the invention is that when they are used as sorbent material, because of their non-measurable low volatility, no such installations are required.

EXAMPLE SYSTEM III

Ammonia ($NH_3$) as Refrigerant

For ammonia as refrigerant, water according to the prior art is the currently most advantageous sorbent material. The restriction of the working temperature of the absorber to 0° C., due to the freezing point of water, can be lowered by more than 20 K by using the liquid organic salts of the invention. Such a temperature reduction is particularly advantageous in multistage deep freezing systems (which, owing to the vapor pressure curve and the melting point of ammonia, can be implemented well with this refrigerant), since a lower absorber temperature, via reduction of the refrigerant vapor pressure, always leads to an improved absorption behavior.

EXAMPLE SYSTEM IV

Water as Refrigerant

According to the prior art, for the refrigerant water, lithium bromide is the most advantageous sorbent material. Lithium bromide has a pure substance melting point of 550° C., whereupon, in the expeller, concentration of this sorbent material, depending on the temperature, can proceed to a maximum of 30 or 40 mass percent residual water fraction. If this limit is undershot, the lithium bromide can crystallize out at least in part and the continuous process comes to a stop.

By using the sorbent materials of the invention such as, for example, 1-ethyl-3-methylimidazolium methylsulfonate or 1-ethyl-3-methylimidazolium acetate and 1-ethyl-3-methylimidazolium hydroxide, the advantages already mentioned above give a considerably higher concentration of the sorbent material in the expeller.

EXAMPLE SYSTEM VII

Liquid Organic Salts as Additive for Working Media
VII a)
Additive for the Working Medium Lithium Bromide/Water By using the additives of the invention 1-ethyl-3-methylimidazolium methylsulfonate, 1-ethyl-3-methylimidazolium acetate, 1-ethyl-3-methylimidazolium hydroxide within the limits of homogeneous miscibility, the crystallization temperature of the sorbent material can be decreased. A higher concentration of the sorbent material is possible in the expeller thereby and the abovementioned advantages over the prior art result.

EXAMPLE VIII

The ionic liquid bis(2-hydroxyethyl)dimethylammonium methylsulfonate ($C_7H_{19}NO_5S$) is produced by a plurality of companies. Information on its synthesis can be found in the publication P. Wasserscheid, T. Welton Ionic Liquids in Synthesis Wiley-VCH, ISBN 3-527-30515-7.

If, as described in
- W. Pennington; How to find accurate vapor pressures of lithium bromide water solutions; Refrig. Eng. 63 (May 1955) 57-61 or
- D. A. Boryta, A. J. Maas, C. B. Grant; Vapor pressure-temperature-concentration relationship for system lithium bromide and water (40-70% lithium bromide); J. Chem. Eng. Data 20 (1975) 316-319 or
- S. Iyoki, T. Uemura; Vapor pressure of the water-lithium bromide system and water-lithium bromide-zinc bromide-lithium chloride system at high temperatures; Int. J. Refrigeration 12 (1989) 278-282, the absorption behavior of the ionic liquid is measured in water at 20° C., in a solution consisting of 80 mass percent bis(2-hydroxyethyl)dimethylammonium methylsulfonate and 20 mass % water, a water partial pressure of 14 mbar results. At 40° C., the water partial pressure in a system consisting of 92 mass % bis(2-hydroxyethyl)-dimethylammonium methylsulfonate and 8 mass % water is approximately 13.9 mbar, so that the use of the ionic liquid of the invention, owing to its good absorption capacity, surprisingly leads to a pressure reduction by the factor 5.3 compared with the vapor pressure of pure water at 40° C. In the prior art, the use of LiBr as absorbent and water as refrigerant is very widespread. Disadvantages of the prior art are
- the crystallization of LiBr in water at LiBr concentrations above 60 mass % LiBr (depending on system temperature),
- the highly corrosive action of LiBr which requires the use of expensive corrosion-resistant materials, for example in an absorption refrigerating machine, or is frequently associated with environmental pollution.

The ionic liquid of the invention bis(2-hydroxyethyl)-dimethylammonium methylsulfonate eliminates these disadvantages of the prior art. In addition to its very good absorption capacity for water, this ionic liquid does not crystallize out at $T \geq 20°$ C. even at concentrations greater than 65 mass % ionic liquid in water. The working range of refrigeration processes such as, for example, absorption refrigerating machines, is therefore significantly greater when this ionic liquid is used, as a result of which higher performance absorption refrigerating machines (same size), or smaller absorption refrigerating machines (same performance) can be built. This ionic liquid of the invention in addition, exhibits a significantly lower corrosiveness than LiBr and therefore also permits the use of cheaper materials in refrigeration processes such as absorption refrigerating machines. Adverse environmental effects of LiBr are likewise significantly reduced by this ionic liquid according to the invention.

EXAMPLE IX

The ionic liquid 1-ethyl-3-methylimidazolium ethyl sulfate ($C_8H_{16}N_2O_4S$, also called EMIM ES) can be obtained from Degussa AG under the name TEGO IL IM ES ($LD_{50}$>2000 mg/kg, $EC_{50}$>100 mg/dm$^3$). If, as described in
- W. Pennington; How to find accurate vapor pressures of lithium bromide water solutions; Refrig. Eng. 63 (May 1955) 57-61 or
- D. A. Boryta, A. J. Maas, C. B. Grant; Vapor pressure-temperature-concentration relationship for system lithium bromide and water (40-70% lithium bromide); J. Chem. Eng. Data 20 (1975) 316-319 or S. Iyoki, T. Uemura; Vapor pressure of the water-lithium bromide system and water-lithium bromide-zinc bromide-lithium chloride system at high temperatures; Int. J. Refrigeration 12 (1989) 278-282, the absorption behavior of the ionic liquid TEGO IL IM ES is measured in water at 20° C., for a solution consisting of 80 mass % TEGO IL IM ES and 20 mass % water, this gives a water partial pressure of 15 mbar.

The vapor pressure of pure water at 20° C. is 23.37 mbar and was therefore lowered by the factor 1.56 by the presence of TEGO IL IM ES. In the prior art, the use of LiBr as absorbent and water as refrigerant is very widespread. Disadvantages of the prior art are the crystallization of LiBr in water at LiBr concentrations above 60 mass % LiBr (depending on system temperature), the highly corrosive action of LiBr which requires the use of expensive corrosion-resistant materials, for example in an absorption refrigerating machine, or is frequently associated with environmental pollution.

The ionic liquid of the invention TEGO IL IM ES eliminates these disadvantages of the prior art. In addition to its very good absorption capacity for water, this ionic liquid does not crystallize out at T≧20° C. even at concentrations greater than 65 mass % ionic liquid in water. The working range of refrigeration processes such as, for example, absorption refrigerating machines, is therefore significantly greater when this ionic liquid is used, as a result of which higher performance absorption refrigerating machines (same size), or smaller absorption refrigerating machines (same performance) can be built. This ionic liquid of the invention in addition, exhibits a significantly lower corrosiveness than LiBr and therefore also permits the use of cheaper materials in refrigeration processes such as absorption refrigerating machines. Adverse environmental effects of LiBr are likewise significantly reduced by this ionic liquid according to the invention.

EXAMPLE X

Ethoxylated cocodiethanolammonium chloride is an ionic liquid which can be obtained under the name TEGO IL K5 from Degussa AG. If, as described in W. Pennington; How to find accurate vapor pressures of lithium bromide water solutions; Refrig. Eng. 63 (May 1955) 57-61 or D. A. Boryta, A. J. Maas, C. B. Grant; Vapor pressure-temperature-concentration relationship for system lithium bromide and water (40-70% lithium bromide); J. Chem. Eng. Data 20 (1975) 316-319 or S. Iyoki, T. Uemura; Vapor pressure of the water-lithium bromide system and water-lithium bromide-zinc bromide-lithium chloride system at high temperatures; Int. J. Refrigeration 12 (1989) 278-282, the absorption behavior of the ionic liquid TEGO IL K5 is measured in water at 20° C., for a solution consisting of 80 mass % TEGO IL K5 and 20 mass % water, this gives a water partial pressure of 17 mbar.

The vapor pressure of pure water at 20° C. is 23.37 mbar and was therefore lowered by the factor 1.38 by the presence of TEGO IL K5. In the prior art, the use of LiBr as absorbent and water as refrigerant is very widespread. Disadvantages of the prior art are the crystallization of LiBr in water at LiBr concentrations above 60 mass % LiBr (depending on system temperature), the highly corrosive action of LiBr which requires the use of expensive corrosion-resistant materials, for example in an absorption refrigerating machine, or is frequently associated with environmental pollution.

The ionic liquid of the invention TEGO IL K5 eliminates these disadvantages of the prior art. In addition to its very good absorption capacity for water, this ionic liquid does not crystallize out at T≧20° C. even at concentrations greater than 65 mass % ionic liquid in water. The working range of refrigeration processes such as, for example, absorption refrigerating machines, is therefore significantly greater when this ionic liquid is used, as a result of which higher performance absorption refrigerating machines (same size), or smaller absorption refrigerating machines (same performance) can be built. This ionic liquid of the invention in addition, exhibits a significantly lower corrosiveness than LiBr and therefore also permits the use of cheaper materials in refrigeration processes such as absorption refrigerating machines. Adverse environmental effects of LiBr are likewise significantly reduced by this ionic liquid according to the invention.

EXAMPLE XI

The ionic liquid diethylpolypropoxymethylammonium chloride can be obtained from Degussa AG under the name TEGO IL P9. If, as described in W. Pennington; How to find accurate vapor pressures of lithium bromide water solutions; Refrig. Eng. 63 (May 1955) 57-61 or D. A. Boryta, A. J. Maas, C. B. Grant; Vapor pressure-temperature-concentration relationship for system lithium bromide and water (40-70% lithium bromide); J. Chem. Eng. Data 20 (1975) 316-319 or S. Iyoki, T. Uemura; Vapor pressure of the water-lithium bromide system and water-lithium bromide-zinc bromide-lithium chloride system at high temperatures; Int. J. Refrigeration 12 (1989) 278-282, the absorption behavior of the ionic liquid TEGO IL P9 is measured in water at 30° C., for a solution consisting of 94 mass % TEGO IL P9 and 6 mass % water, this gives a water partial pressure of 6 mbar.

The vapor pressure of pure water at 30° C. is 42.41 mbar and was therefore surprisingly decreased by the factor 7.07 by the presence of TEGO IL P9. In the prior art, the use of LiBr as absorbent and water as refrigerant is very widespread. Disadvantages of the prior art are the crystallization of LiBr in water at LiBr concentrations above 60 mass % LiBr (depending on system temperature), the highly corrosive action of LiBr which requires the use of expensive corrosion-resistant materials, for example in an absorption refrigerating machine, or is frequently associated with environmental pollution.

The ionic liquid of the invention TEGO IL P9 eliminates these disadvantages of the prior art. In addition to its very good absorption capacity for water, this ionic liquid does not crystallize out at T≧20° C. even at concentrations greater than 65 mass % ionic liquid in water. The working range of refrigeration processes such as, for example, absorption refrigerating machines, is therefore significantly greater when this ionic liquid is used, as a result of which higher performance absorption refrigerating machines (same size), or smaller absorption refrigerating machines (same performance) can be built. This ionic liquid of the invention in addition, exhibits a significantly lower corrosiveness than LiBr and therefore also permits the use of cheaper materials in refrigeration processes such as absorption refrigerating machines. Adverse environmental effects of LiBr are likewise significantly reduced by this ionic liquid according to the invention.

EXAMPLE XII

The ionic liquid 1-ethyl-3-methylimidazolium methanesulfonate (CAS No.: 145022-45-3, hereinafter called EMIM MeSO3) can be obtained from the German company Solvent Innovation GmbH. If, as described in W. Pennington; How to find accurate vapor pressures of lithium bromide water solutions; Refrig. Eng. 63 (May 1955) 57-61 or D. A. Boryta, A. J. Maas, C. B. Grant; Vapor pressure-temperature-concentration relationship for system lithium bromide and water (40-70% lithium bromide); J. Chem. Eng. Data 20 (1975) 316-319 or S. Iyoki, T. Uemura; Vapor pressure of the water-lithium bromide system and water-lithium bromide-zinc bromide-lithium chloride system at high temperatures; Int. J. Refrigeration 12 (1989) 278-282, the absorption behavior of the ionic liquid EMIM MeSO3 is measured in water at 30° C., for a solution consisting of 87 mass % EMIM MeSO3 and 13 mass % water, this gives a water partial pressure of 9 mbar.

The vapor pressure of pure water at 30° C. is 42.41 mbar and was therefore lowered by the factor 4.7 by the presence of EMIM MeSO3. In the prior art, the use of LiBr as absorbent and water as refrigerant is very widespread. Disadvantages of the prior art are the crystallization of LiBr in water at LiBr concentrations above 60 mass % LiBr (depending on system temperature), the highly corrosive action of LiBr which requires the use of expensive corrosion-resistant materials, for example in an absorption refrigerating machine, or is frequently associated with environmental pollution.

The ionic liquid of the invention EMIM MeSO3 eliminates these disadvantages of the prior art. In addition to its very good absorption capacity for water, this ionic liquid does not crystallize out at $T \geq 20°$ C. even at concentrations greater than 65 mass % ionic liquid in water. The working range of refrigeration processes such as, for example, absorption refrigerating machines, is therefore significantly greater when this ionic liquid is used, as a result of which higher performance absorption refrigerating machines (same size), or smaller absorption refrigerating machines (same performance) can be built. This ionic liquid of the invention in addition, exhibits a significantly lower corrosiveness than LiBr and therefore also permits the use of cheaper materials in refrigeration processes such as absorption refrigerating machines. Adverse environmental effects of LiBr are likewise significantly reduced by this ionic liquid according to the invention.

EXAMPLE XIII

The process according to the invention in FIG. 1 can likewise be operated not with LiBr, but with suitable ionic liquids which at 0° C.<T<150° C. and 1 mass %<$w_{IL}$<99 mass %, with water form a liquid-liquid miscibility gap. Particularly suitable ionic liquids are the abovementioned compounds, in particular:

a) 1-methyl-3-octylimidazolium tetrafluoroborate (CAS: 244193-52-0)

b) butylmethylpyrrolidinium bis(trifluoromethylsulfonyl)-imide (obtainable from Solvent-Innovation; order no.: 99, 331-1).

On the basis of the examples presented, it may be seen that the sorbent material concept with the sorbent materials according to the invention is applicable to selected representatives of all currently relevant refrigerant types. It has been shown that in each case at least one disadvantage according to the prior art was overcome by using the sorbent materials according to the invention.

The ionic liquids according to the invention, for use as sorbent material in a working medium for a conventional absorption refrigerating machine or absorption heat pump process exhibit, compared with the prior art, a lower viscosity or a higher density, a higher heat capacity, a lower volatility, a lower biotoxicity, a higher chemical or thermal stability, a lower price, a higher absorption capacity for the working medium water and/or a lower solidification temperature.

One example of an ionic liquid which cannot be used for the purposes of the present invention is 2-hydroxyethylammonium formate. This substance has a number of disadvantages which can be avoided at least in part by using the selection of ionic liquids according to the invention:

2-Hydroxyethylammonium formate is thermally stable only up to 150° C. [as described by N. Bicak in: Journal of Molecular Liquids 116 (2005) 15-18].

2-Hydroxyethylammonium formate, at 25° C., has a vapor pressure of $2.2 \times 10^{-2}$ torr [as described by N. Bicak in: Journal of Molecular Liquids 116 (2005) 15-18]. The vapor pressure of the ionic liquids according to the invention is preferably less than that of 2-hydroxyethylammonium formate which, in absorption refrigerating machines, leads to advantages in the separation of refrigerant and absorption medium, but also in the operating costs and capital costs. Furthermore, a higher vapor pressure also means a higher hazard potential.

The synthesis of 2-hydroxyethylammonium formate is highly exothermic and, in contrast to the synthesis of the ionic liquids of the invention, requires an efficient cooling for control of the hazard potential.

The viscosity behavior of the ionic liquid 2-hydroxyethylammonium formate is more temperature dependent than the viscosity behavior of ionic liquids which are particularly preferably used for the purposes of the present invention.

2-Hydroxyethylammonium formate is more toxic than the ionic liquids which are preferably used for the purposes of the present invention such as, for example, 1-ethyl-3-methylimidazolium ethyl sulfate (TEGO IL IMES).

2-Hydroxyethylammonium formate is comparatively expensive.

2-Hydroxyethylammonium formate has a comparatively poor stability to hydrolysis.

2-Hydroxyethylammonium formate is classified in the hazard class irritant and may not pass into wastewater, since it is toxic to fish and other organisms living in the water.

2-Hydroxyethylammonium formate is corrosive at high temperatures.

Combustion of 2-hydroxyethylammonium formate leads to the formation of toxic gases.

The comparatively high volatility of 2-hydroxyethylammonium formate causes solvent losses and the hazard of formation of explosive vapors.

In addition to the use of liquid organic salts as sorbent material or additive in refrigerating machines of the prior art, the use of these substances in absorption refrigerating machines according to the invention in which at least the expeller is replaced by one or more settlers leads to energetic advantages compared with the prior art. Hereinafter, an advantageous embodiment of the process according to the invention is presented by way of example (cf. FIG. 1).

The working medium, downstream of the absorber 1, is passed by means of a pump 2 into at least one heat exchanger 3a in which it takes up or releases heat $Q_{zu}$. By means of the heat uptake or heat release, the working solution which is still homogeneously liquid at point 1 and which, in addition to the sorbent material and the refrigerant, can also contain additives, is in a liquid-liquid miscibility gap which is distinguished by an upper or lower critical solution temperature. The heat exchanger 3a is followed by at least one phase separation apparatus, the settler 4, in which the working solution separates into two liquid phases, a sorbent material-rich phase, and a refrigerant-rich phase. The settler can contain coalescence- and sedimentation-promoting internals.

The refrigerant-rich phase is thereafter passed through at least one heat exchanger 3b and a throttle 5a. In the evaporator 6 the for the most part liquid refrigerant takes up the heat $Q_{zu}$ and is converted in this case at least in part into the vaporous state of matter. Subsequently, a further transfer in a heat exchanger (for example 3b) can proceed, before the refrigerant-rich phase is introduced into the absorber, absorbed by a sorbent material, and in this process the heat of absorption $Q_{ab}$ is given off.

The absorbent-rich phase can, downstream of the settler 4, again be transported through a heat exchanger (for example 3a) before it is then expanded in a throttle 5b to absorber pressure and fed to the absorber 1.

According to sorbent material and refrigerant, in the process according to the invention, in settler 4, a temperature of $-50°$ C.$<T<250°$ C., preferably from $-20°$ C.$<T<200°$ C. and particularly preferably from $-10°$ C.$<T<180°$ C. at a settler system pressure to be established between 0.01 bar$<P<200$ bar, must be selected, in absorber 1, a temperature of $-50°$ C.$<T<200°$ C., preferably from $-30°$ C.$<T<150°$ C., and particularly preferably from $-20°$ C.$<T<100°$ C. at an absorber system pressure between 0.01 bar$<P<60$ bar must be selected and in the heat exchangers 3a and 3b, in each case a heat transfer surface of 0.1 m$^2<A<300$ m$^2$, preferably from 0.2 m$^2<A<200$ m$^2$, and particularly preferably from 0.3 m$^2<A<150$ m$^2$ must be provided.

Alternatively to the illustrated advantageous embodiment of the process according to the invention, the sorbent materials or additives according to the invention can also be used in at least one stage of a single-stage or multistage absorption refrigerator having at least one heated expeller and subsequent refrigerant condenser, as described, for example, in Vauck, W. R. A. and Müller, H. A., Grundoperationen chemischer Verfahrenstechnik [Unit operations of chemical process engineering], 10th edition, page 527, Leipzig 1994, ISBN 3-342-00629-3.

Further advantageous embodiments of the process according to the invention are obtained when one or more stages of a multistage refrigerating machine have been replaced by the above illustrated embodiment or sorbent materials or additives according to the invention are used in at least one stage of the refrigerating machine, for example in ventilation or air conditioning, such as in building engineering, in vehicle technology, marine engineering, aviation and space travel or in the container industry.

The invention claimed is:

1. A working medium for refrigeration processes, comprising at least one sorbent material and at least one refrigerant, wherein the sorbent material comprises at least one nonvolatile organic salt which is liquid under standard conditions, or a mixture of organic salts which is liquid under standard conditions, and wherein said nonvolatile organic salt or said mixture of organic salts is thermally stable above 150° C. and comprises an anion from the group consisting of alkyl and aryl tosylates, fluoroalkyl tosylates, nitrate, sulfate, hydrogensulfate, alkyl and aryl sulfates, polyether sulfates and polyethersulfonates, fluoroalkyl sulfates, alkyl and arylsulfonates, fluorinated alkyl and arylsulfonates, alkyl and aryl carboxylates, fluoroalkyl carboxylates, cyanate, polyetherphosphates and dicyanamide anion.

2. The working medium of claim 1, wherein said working medium has a long-term stability such that after storage at 70° C. for 8000 h, it displays a degradation of a maximum of 5% compared to said working medium at the start of said storage.

3. The working medium of claim 1, wherein the working medium has an $LD_{50}$ value greater than 1000 mg/kg and/or an $EC_{50}$ value greater than 50 mg/l.

4. The working medium of claim 1, wherein said working medium, in a glassware corrosion test as specified in ASTM D1384, shows a maximum erosion of 5 g/m$^2$.

5. The working medium of claim 1, wherein said working medium contains an organic salt or a salt mixture which lowers the partial pressure of the refrigerant, measured at 30° C. for a composition consisting of 90 mass % organic salt or salt mixture and 10 mass % refrigerant, by at least the factor 1.5 compared with the vapor pressure of the refrigerant at 30° C.

6. The working medium of any one of claims 1-5, wherein said working medium comprises one or more compounds selected from the group consisting of: 1-methyl-2-nortallowalkyl-3-tallowamido-ethylimidazolium methyl sulfate, 1-ethyl-3-methylimidazolium ethyl sulfate, ethoxylated cocoamine, quaternized with dimethyl sulfate, diethylpolypropoxyhydroxyethylammonium phosphate, diethylpolypropoxy-hydroxyethylammonium acetate, ethoxylated tallowamine, quaternized with diethyl sulfate, bis(2-hydroxyethyl)dimethyl-ammonium methylsulfonate, 1ethyl-3-methylimidazolium acetate, N-methyl-pyrrolinium acetate, 1-ethyl-3-methylimidazolium ethyl sulfate, 1-ethyl-3-methylimidazolium methylsulfonate, 1butyl-3-methylimidazolium methanesulfonate, methyl-tri-n-butylammonium methyl sulfate, 1,2,4-trimethylpyrazolium methyl sulfate, 1-ethyl-2,3-dimethylimidazolium ethyl sulfate, 1,2,3-trimethylimidazolium methyl sulfate, methylimidazolium hydrogensulfate, 1-ethyl-3-methylimidazolium hydrogensulfate, 1-butyl-3-methylimidazolium hydrogen-sulfate, 1-butyl-3-methylimidazolium acetate, 1-butyl-3-methylimidazolium methyl sulfate, choline acetate, choline salicylate, tris-(2-hydroxyethyl)methyl-ammonium methyl sulfate, 1-ethyl-3-methylimidazolium dicyanamide, N-ethyl-N-methylpyrrolidinium dicyanamide, N-propyl-N-methylpyrrolidinium dicyanamide, N-butyl-N-methylpyrrolidinium dicyanamide, N-hexyl-N-methylpyrrolidinium dicyanamide, N-pentyl-N,N,N-triethylammonium dicyanamide, N-hexyl-N,N,N-triethylammonium dicyanamide, N-hexyl-N,N,N-tributylammonium dicyanamide, 1-methyl-3-methylimidazolium lactate, 1-ethyl-3-methylimidazolium lactate, 1-propyl-3-methylimidazolium lactate, 1-butyl-3-methylimidazolium lactate, 1-butoxy-3-methylimidazolium lactate, 1-ethyl-3-methylimidazolium nitrate, 1-ethyl-3-methylimidazolium tosylate, 1-butyl-1-methylpyrrolidinium dicyanamide and/or tributylmethylphosphonium methyl sulfate.

7. The working medium of claim 1, wherein said working medium comprises one or more compounds selected from the group consisting of: 1-methyl-2-nortallowalkyl-3-tallowamido-ethylimidazolium methyl sulfate, 1-ethyl-3-methylimidazolium ethyl sulfate, ethoxylated cocoamine, quaternized with dimethyl sulfate, diethylpolypropoxyhydroxyethylammonium phosphate, diethylpolypropoxy-hydroxyethylammonium acetate, ethoxylated tallowamine, quaternized with diethyl sulfate, bis(2-hydroxyethyl)dimethylammonium methylsulfonate, 1ethyl-3-methylimidazolium acetate, N-methyl-pyrrolinium acetate, 1-ethyl-3-methylimidazolium ethyl sulfate, 1-ethyl-3-methylimidazolium methylsulfonate, 1butyl-3-methylimidazolium methanesulfonate, methyl-tri-n-butylammonium methyl sulfate, 1,2,4-trimethylpyrazolium methyl sulfate, 1-ethyl-2,3-dimethylimidazolium ethyl sulfate, 1,2,3-trimethylimidazolium methyl sulfate, methylimidazolium hydrogensulfate, 1-ethyl-3-methylimidazolium hydrogensulfate, 1-butyl-3-methylimidazolium hydrogen-sulfate, 1-butyl-3-methylimidazolium acetate, 1-butyl-3-methylimidazolium methyl sulfate, choline acetate, choline salicylate, tris-(2-hydroxyethyl)methyl-ammonium methyl sulfate, 1-ethyl-3-methylimidazolium dicyanamide, N-ethyl-N-methylpyrrolidinium dicyanamide, N-propyl-N-methylpyrrolidinium dicyanamide, N-butyl-N-methylpyrrolidinium dicyanamide, N-hexyl-N-methylpyrrolidinium dicyanamide, N-pentyl-N,N,N-triethylammonium dicyanamide, N-hexyl-N,N,N-triethylammonium dicyanamide, N-hexyl-N,N,N-tributylammonium dicyanamide, 1-methyl-3-methylimidazolium lactate, 1-ethyl-3-methylimidazolium lactate, 1-propyl-3-methylimidazolium lactate, 1-butyl-3-methylimidazolium lactate, 1-butoxy-3-methylimidazolium lactate, 1-ethyl-3-methylimidazolium nitrate, 1-ethyl-3-methylimidazolium tosylate, 1-butyl-1-methylpyrrolidinium dicyanamide and/or tributylmethylphosphonium methyl sulfate;

and wherein:
a) said working medium has an $LD_{50}$ value greater than 1000 mg/kg and/or an $EC_{50}$ value greater than 50 mg/l; and
b) said working medium has a long-term stability such that after storage at 70° C. for 8000 h, it displays a degradation of a maximum of 5% compared to said working medium at the start of said storage.

8. The working medium of claim 7, wherein said working medium, in a glassware corrosion test as specified in ASTM D1384, shows a maximum erosion of 5 g/m².

9. The working medium of claim 8, wherein said working medium contains an organic salt or a salt mixture which lowers the partial pressure of the refrigerant, measured at 30° C. for a composition consisting of 90 mass % organic salt or salt mixture and 10 mass % refrigerant, by at least the factor 1.5 compared with the vapor pressure of the refrigerant.

10. A refrigeration process comprising the transfer of heat using a working medium, wherein said working medium comprises at least one sorbent material and at least one refrigerant, wherein the sorbent material comprises at least one nonvolatile organic salt which is liquid under standard conditions, or a mixture of organic salts which is liquid under standard conditions, and wherein said nonvolatile organic salt or said mixture of organic salts is thermally stable above 150° C. and comprises an anion from the group consisting of alkyl and aryl tosylates, fluoroalkyl tosylates, nitrate, sulfate, hydrogensulfate, alkyl and aryl sulfates, polyether sulfates and polyethersulfonates, fluoroalkyl sulfates, alkyl and arylsulfonates, fluorinated alkyl and arylsulfonates, alkyl and aryl carboxylates, fluoroalkyl carboxylates, cyanate, polyetherphosphates and dicyanamide anion.

11. The refrigeration process of claim 10, wherein said working medium has a long-term stability such that after storage at 70° C. for 8000 h, it displays a degradation of a maximum of 5% compared to said working medium at the start of said storage.

12. The refrigeration process of claim 10, wherein said working medium has an $LD_{50}$ value greater than 1000 mg/kg and/or an $EC_{50}$ value greater than 50 mg/l.

13. The refrigeration process of claim 10, wherein said working medium, in a glassware corrosion test as specified in ASTM D1384, shows a maximum erosion of 5 g/m².

14. The refrigeration process of claim 10, wherein said working medium contains an organic salt or a salt mixture which lowers the partial pressure of the refrigerant, measured at 30° C. for a composition consisting of 90 mass % organic salt or salt mixture and 10 mass % refrigerant, by at least the factor 1.5 compared with the vapor pressure of the refrigerant at 30° C.

15. The refrigeration process of any one of claims 11-14, wherein said working medium comprises one or more compounds selected from the group consisting of: 1-methyl-2-nortallowalkyl-3-tallowamido-ethylimidazolium methyl sulfate, 1-ethyl-3-methylimidazolium ethyl sulfate, ethoxylated cocoamine, quaternized with dimethyl sulfate, diethylpolypropoxyhydroxyethylammonium phosphate, diethylpolypropoxy-hydroxyethylammonium acetate, ethoxylated tallowamine, quaternized with diethyl sulfate, bis(2-hydroxyethyl)dimethyl-ammonium methylsulfonate, 1ethyl-3-methylimidazolium acetate, N-methyl-pyrrolinium acetate, 1-ethyl-3-methylimidazolium ethyl sulfate, 1-ethyl-3-methylimidazolium methylsulfonate, 1butyl-3-methylimidazolium methanesulfonate, methyl-tri-n-butylammonium methyl sulfate, 1,2,4-trimethylpyrazolium methyl sulfate, 1-ethyl-2,3-dimethylimidazolium ethyl sulfate, 1,2,3-trimethylimidazolium methyl sulfate, methylimidazolium hydrogensulfate, 1-ethyl-3-methylimidazolium hydrogensulfate, 1-butyl-3-methylimidazolium hydrogen-sulfate, 1-butyl-3-methylimidazolium acetate, 1-butyl-3-methylimidazolium methyl sulfate, choline acetate, choline salicylate, tris-(2-hydroxyethyl)methyl-ammonium methyl sulfate, 1-ethyl-3-methylimidazolium dicyanamide, N-ethyl-N-methylpyrrolidinium dicyanamide, N-propyl-N-methylpyrrolidinium dicyanamide, N-butyl-N-methylpyrrolidinium dicyanamide, N-hexyl-N-methylpyrrolidinium dicyanamide, N-pentyl-N,N,N-triethylammonium dicyanamide, N-hexyl-N,N,N-triethylammonium dicyanamide, N-hexyl-N,N,N-tributylammonium dicyanamide, 1-methyl-3-methylimidazolium lactate, 1-ethyl-3-methylimidazolium lactate, 1-propyl-3-methylimidazolium lactate, 1-butyl-3-methylimidazolium lactate, 1-butoxy-3-methylimidazolium lactate, 1-ethyl-3-methylimidazolium nitrate, 1-ethyl-3-methylimidazolium tosylate, 1-butyl-1-methylpyrrolidinium dicyanamide and/or tributylmethylphosphonium methyl sulfate.

16. The refrigeration process of claim 10, wherein at least one component of the working medium passes through a cyclic process with supply or removal of heat or mechanical energy.

17. The refrigeration process of claim 10, wherein said process comprises a liquid-liquid phase separation of the working medium.

18. The refrigeration process of claim 17, wherein, in the liquid-liquid phase separation, a sorbent material-containing liquid phase having a sorbent material concentration of at least 20% by weight and a refrigerant-containing liquid phase having a refrigerant concentration of at least 20% by weight are formed.

19. The refrigeration process of claim 10, wherein said refrigeration process is performed in: ventilation or air conditioning; automotive engineering; marine engineering; aviation or space travel; container technology; cold stores or refrigerated transporters; process engineering for air drying; absorption of gases; or central or mobile facilities for heat recovery.

20. A refrigerating machine comprising at least one heat exchanger, an expansion element, an absorber and a working medium, wherein said working medium comprises at least one sorbent material and at least one refrigerant, wherein the sorbent material comprises at least one nonvolatile organic salt which is liquid under standard conditions, or a mixture of organic salts which is liquid under standard conditions, and wherein said nonvolatile organic salt or said mixture of organic salts is thermally stable above 150° C. and comprises an anion from the group consisting of alkyl and aryl tosylates, fluoroalkyl tosylates, nitrate, sulfate, hydrogensulfate, alkyl and aryl sulfates, polyether sulfates and polyethersulfonates, fluoroalkyl sulfates, alkyl and arylsulfonates, fluorinated alkyl and arylsulfonates, alkyl and aryl carboxylates, fluoroalkyl carboxylates, cyanate, polyetherphosphates and dicyanamide anion.

21. The refrigerating machine of claim 20, wherein said working medium has a long-term stability such that after storage at 70° C. for 8000 h, it displays a degradation of a maximum of 5% compared to said working medium at the start of said storage.

22. The refrigerating machine of claim 20, wherein said working medium has an $LD_{50}$ value greater than 1000 mg/kg and/or an $EC_{50}$ value greater than 50 mg/l.

23. The refrigerating machine of claim 20, wherein said working medium, in a glassware corrosion test as specified in ASTM D1384, shows a maximum erosion of 5 g/m².

24. The refrigerating machine of claim 20, wherein said working medium contains an organic salt or a salt mixture which lowers the partial pressure of the refrigerant, measured at 30° C. for a composition consisting of 90 mass % organic salt or salt mixture and 10 mass % refrigerant, by at least the factor 1.5 compared with the vapor pressure of the refrigerant at 30° C.

25. The refrigerating machine of any one of claims 20-24, wherein said working medium comprises one or more compounds selected from the group consisting of: 1-methyl-2-nortallowalkyl-3-tallowamido-ethylimidazolium methyl sulfate, 1-ethyl-3-methylimidazolium ethyl sulfate, ethoxylated cocoamine, quaternized with dimethyl sulfate, diethylpolypropoxyhydroxyethylammonium phosphate, diethylpolypropoxy-hydroxyethylammonium acetate, ethoxylated tallowamine, quaternized with diethyl sulfate, bis(2-hydroxyethyl)dimethyl-ammonium methylsulfonate, 1ethyl-3-methylimidazolium acetate, N-methyl-pyrrolinium acetate, 1-ethyl-3-methylimidazolium ethyl sulfate, 1-ethyl-3-methylimidazolium methylsulfonate, 1butyl-3-methylimidazolium methanesulfonate, methyl-tri-n-butylammonium methyl sulfate, 1,2,4-trimethylpyrazolium methyl sulfate, 1-ethyl-2,3-dimethylimidazolium ethyl sulfate, 1,2,3-trimethylimidazolium methyl sulfate, methylimidazolium hydrogensulfate, 1-ethyl-3-methylimidazolium hydrogensulfate, 1-butyl-3-methylimidazolium hydrogen-sulfate, 1-butyl-3-methylimidazolium acetate, 1-butyl-3-methylimidazolium methyl sulfate, choline acetate, choline salicylate, tris-(2-hydroxyethyl)methyl-ammonium methyl sulfate, 1-ethyl-3-methylimidazolium dicyanamide, N-ethyl-N-methylpyrrolidinium dicyanamide, N-propyl-N-methylpyrrolidinium dicyanamide, N-butyl-N-methylpyrrolidinium dicyanamide, N-hexyl-N-methylpyrrolidinium dicyanamide, N-pentyl-N,N,N-triethylammonium dicyanamide, N-hexyl-N,N,N-triethylammonium dicyanamide, N-hexyl-N,N,N-tributylammonium dicyanamide, 1-methyl-3-methylimidazolium lactate, 1-ethyl-3-methylimidazolium lactate, 1-propyl-3-methylimidazolium lactate, 1-butyl-3-methylimidazolium lactate, 1-butoxy-3-methylimidazolium lactate, 1-ethyl-3-methylimidazolium nitrate, 1-ethyl-3-methylimidazolium tosylate, 1-butyl-1-methylpyrrolidinium dicyanamide and/or tributylmethylphosphonium methyl sulfate.

26. The refrigerating machine of any one of claims 20-24, wherein said refrigerating machine is a refrigerator, freezer or air conditioner.

27. The refrigerating machine of claim 26, further comprising a mixer-settler.

\* \* \* \* \*